(12) United States Patent
Pae

(10) Patent No.: US 10,215,478 B2
(45) Date of Patent: Feb. 26, 2019

(54) WATER VALVE PREVENTING REDUNDANT WATER FROM DRIPPING AND REFRIGERATOR USING THE SAME

(71) Applicant: LG ELECTRONICS INC., Seoul (KR)

(72) Inventor: Chanju Pae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/586,905

(22) Filed: May 4, 2017

(65) Prior Publication Data

US 2017/0350640 A1    Dec. 7, 2017

(30) Foreign Application Priority Data

Jun. 2, 2016    (KR) .................. 10-2016-0068800

(51) Int. Cl.
*F25D 23/12* (2006.01)
*B67D 3/00* (2006.01)
(Continued)

(52) U.S. Cl.
CPC ......... *F25D 23/126* (2013.01); *B67D 3/0009* (2013.01); *B67D 3/0096* (2013.01); *F16K 1/06* (2013.01); *F16K 23/00* (2013.01)

(58) Field of Classification Search
CPC ... F25D 23/126; B67D 3/0009; B67D 3/0096; B67D 3/02; B67D 2001/0093–2001/0094
(Continued)

(56) References Cited

U.S. PATENT DOCUMENTS 5,857,596 A * 1/1999 Lee ................. B67D 3/0025
222/146.6
6,969,046 B2 * 11/2005 Streutker ............ B05B 9/0861
251/214
(Continued)

FOREIGN PATENT DOCUMENTS

| CN | 103673478 | 3/2014 |
| KR | 10-2012-0030682 | 3/2012 |
| KR | 10-2013-0032010 | 4/2013 |

OTHER PUBLICATIONS

Chen, e al., Translation of the Description of CN103673478(A) into English, Mar. 26, 2014, pp. 1-8.*
(Continued)

*Primary Examiner* — Andrew P Bainbridge
(74) *Attorney, Agent, or Firm* — Ked & Associates, LLP

(57) ABSTRACT

A water valve, in which a water film is formed when the water valve connected to a water tank provided at a refrigerator door is opened and then closed and thus water film sealing is established downstream of an opening/closing surface of the water valve, thereby preventing dripping of water remaining in the water valve, enabling a clean use, and a refrigerator using the water valve. A valve body structure, in which a tube for guiding a flow of water toward a portion where a water film is to be formed between a nozzle and a valve is provided at the valve and an opening for releasing a water pressure even when the flow of water excessively concentrates, and thus, the water flowing through the opening may join a mainstream of the water discharged through a water passing hole.

16 Claims, 15 Drawing Sheets

(51) Int. Cl.
  *F16K 1/06*    (2006.01)
  *F16K 23/00*   (2006.01)
(58) Field of Classification Search
  USPC .......... 251/319–323; 222/108–111, 188,
           222/285–286, 321.3, 375, 204, 409, 505,
                    222/507, 509, 513–514, 518
  See application file for complete search history.

(56)         References Cited

U.S. PATENT DOCUMENTS

2011/0011897 A1*  1/2011  Bellmore .............. B67D 3/043
                                                   222/505
2015/0239725 A1*  8/2015  Watts ................. B67D 3/0025
                                                     222/1

OTHER PUBLICATIONS

English Translation of the Specification for KR 10-2013-0032010A, Apr. 1, 2013, Tongyang, Inc.*
European Search Report dated Oct. 12, 2017.
Korean Office Action dated Mar. 5, 2018 issued in Application No. 10-2016-0068800.

* cited by examiner

WATER VALVE PREVENTING REDUNDANT WATER FROM DRIPPING AND REFRIGERATOR USING THE SAME

CROSS-REFERENCE TO RELATED APPLICATION(S)

This application claims the priority of Korean Patent Application No. 10-2016-0068800, filed in Korea on Jun. 2, 2016, in the Korean Intellectual Property Office, the disclosure of which is hereby incorporated by reference in its entirety.

BACKGROUND

1. Field

The present disclosure relates to a water valve, and a refrigerator using the water valve.

2. Background

Refrigerators have become equipped with various functions such as a water filtering function in addition to functions of refrigerating and freezing to keep food cool. Furthermore, there are functions of storing water filtered by the refrigerator in a water tank and keeping the filtered water in a refrigerated state, or phase-changing the filtered water to ice pieces by using an ice maker and keeping the ice pieces in a frozen state in an ice bucket and so forth. The water stored in the water tank may be generally obtained as a user opens/closes the water valve. The water valve may be provided at a front face of a door.

FIG. 1 is a cross-sectional view illustrating a water valve 50 according to the related art in a closed position. FIG. 2 is a cross-sectional view illustrating the water valve 50 of FIG. 1 in an opened position. A pipe part 60 of the water valve 50 may be connected to a water tank via a coupling part 67, and a valve body 70 for opening/closing an opening/closing surface 51 of the pipe part 60 by sliding along a lengthwise direction of the pipe part 60 may be inserted in a leading end portion of the pipe part 60.

A water passing hole 711 may be provided in the valve body 70, and an outer insertion part 73 may protrude and extend around the valve body 70 in parallel to the lengthwise direction of the pipe part 60. The outer insertion part 73 may be inserted between an outer wall 61 and an inner wall 62 of the pipe part 60 with a spring 40 interposed therebetween. When the valve body 70 is pressed toward the pipe part 60, the outer insertion part 73 of the valve body 70 may slide in the lengthwise direction in a space between the outer wall 61 and the inner wall 62 of the pipe part 60. Accordingly, as illustrated in FIG. 2, an opening/closing ring 75 of the valve body 70 may be pushed back deep in the pipe part 60 and thus the opening/closing surface 51 may be opened. As a result, water stored upstream 52 may be discharged through the water passing hole 711 via the opening/closing surface 51 and a front-room portion 53 downstream thereof.

When the force pressing the valve body 70 is removed, the valve body 70 may move back toward the leading end portion of the pipe part 60 by an elastic body 40 and then the opening/closing ring 75 may block the opening/closing surface 51. An outer circumferential surface of the inner wall 62 and an inner circumferential surface of the outer insertion part 73 may face each other with a fine gap interposed therebetween. When a water film S is formed in the gap, all other portions of the front-room portion 53 located downstream of the opening/closing surface 51, except for the water passing hole 711, may be in a sealed state. Accordingly, the redundant water remaining in the front-room portion 53 even under the effect of gravity may be prevented from dripping through the water passing hole 711.

In order to form the water film S in the gap, various conditions must be satisfied. Particularly, water pressure and dimensions of the gap need to precisely match each other. However, the water pressure applied to the front-room portion 53 varies according to the size of the water tank and also varies according to the amount of water stored in the water tank. Accordingly, the dimensions of the gap may be determined dependent on the size of the water tank and the amount of stored water.

For example, when the water pressure is too strong compared to the dimensions of the gap, water in the front-room portion 53 may flow up along the gap and into the space between the inner wall 62 and the outer wall 61 of the pipe part 60 and thus the water may leak through a gap between an outer diametric surface of the outer insertion part 73 of the valve body 70 and an inner diametric surface of the outer wall 61 of the pipe part 60. When the water pressure is weak, the water in the front-room portion 53 may not enter into the gap and thus the water film seal may not be formed and the redundant water in the front-room portion 53 may drip through the water passing hole 711. According to the above phenomenon, since the size of the water tank and the size of the water valve 50 have a sensitive correlationship with each other, the size of the water valve 50 must correlate with to the size of the water tank.

In addition, considering the above conditions, the dimensions of the gap need to be very precisely managed. Accordingly, the dimensional tolerance of each of the outer surface of the inner wall 62 of the pipe part 60 and the inner wall of the outer insertion part 73 of the valve body 70 needs to be precisely managed. Furthermore, since the tolerance of the gap is accumulated according to the tolerances of the two dimensions, the tolerances of the two dimensions need to be further precisely managed compared to a typical case.

Accordingly, not only is an allowable range of the tolerance very narrow, but also a very slight deviation from the allowable range of tolerance occurring during manufacture may cause dripping of the redundant water after the valve is closed or leaking of water through a gap other than the water passing hole during water intake. When the water leaks around the water valve as described above, the water valve may always have water around it and thus it may be vulnerable to bacterial propagation, which may lead to consumer complaints.

BRIEF DESCRIPTION OF THE DRAWINGS

Embodiments will be described in detail with reference to the following drawings in which like reference numerals refer to like elements, and wherein.

DETAILED DESCRIPTION

Figure 3:
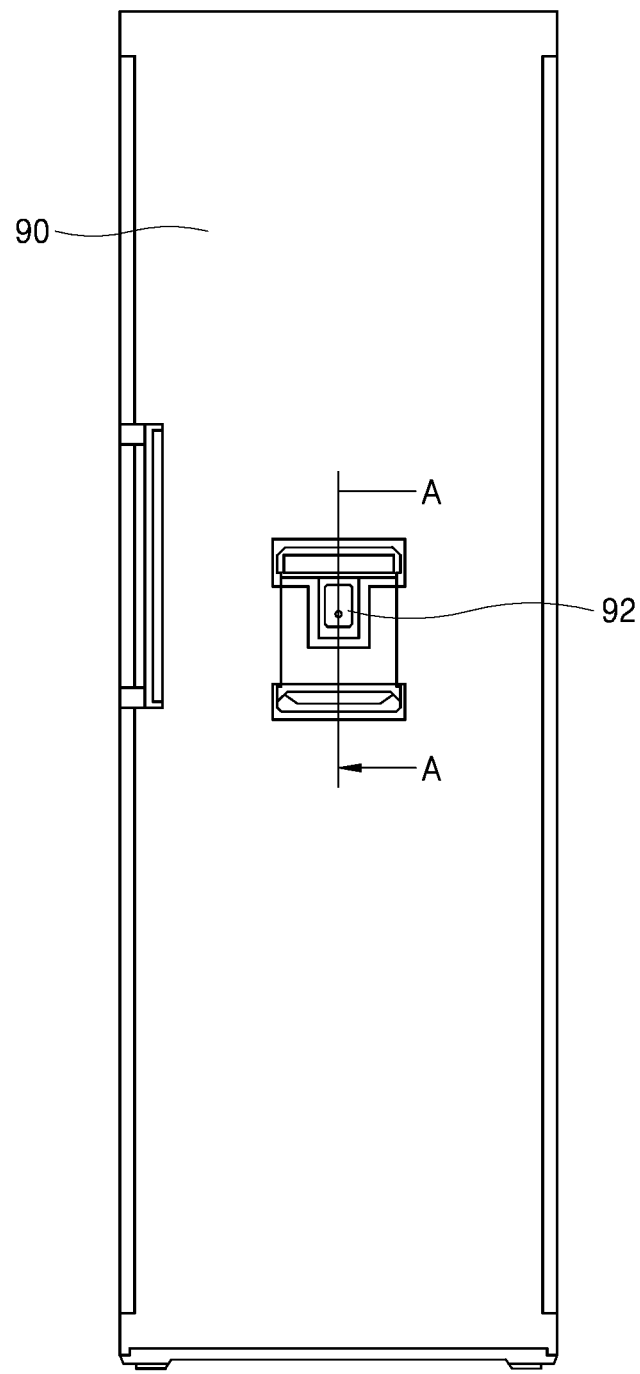
FIG. 3 is a front view of a refrigerator door where a water valve is provided.
Figure 4:
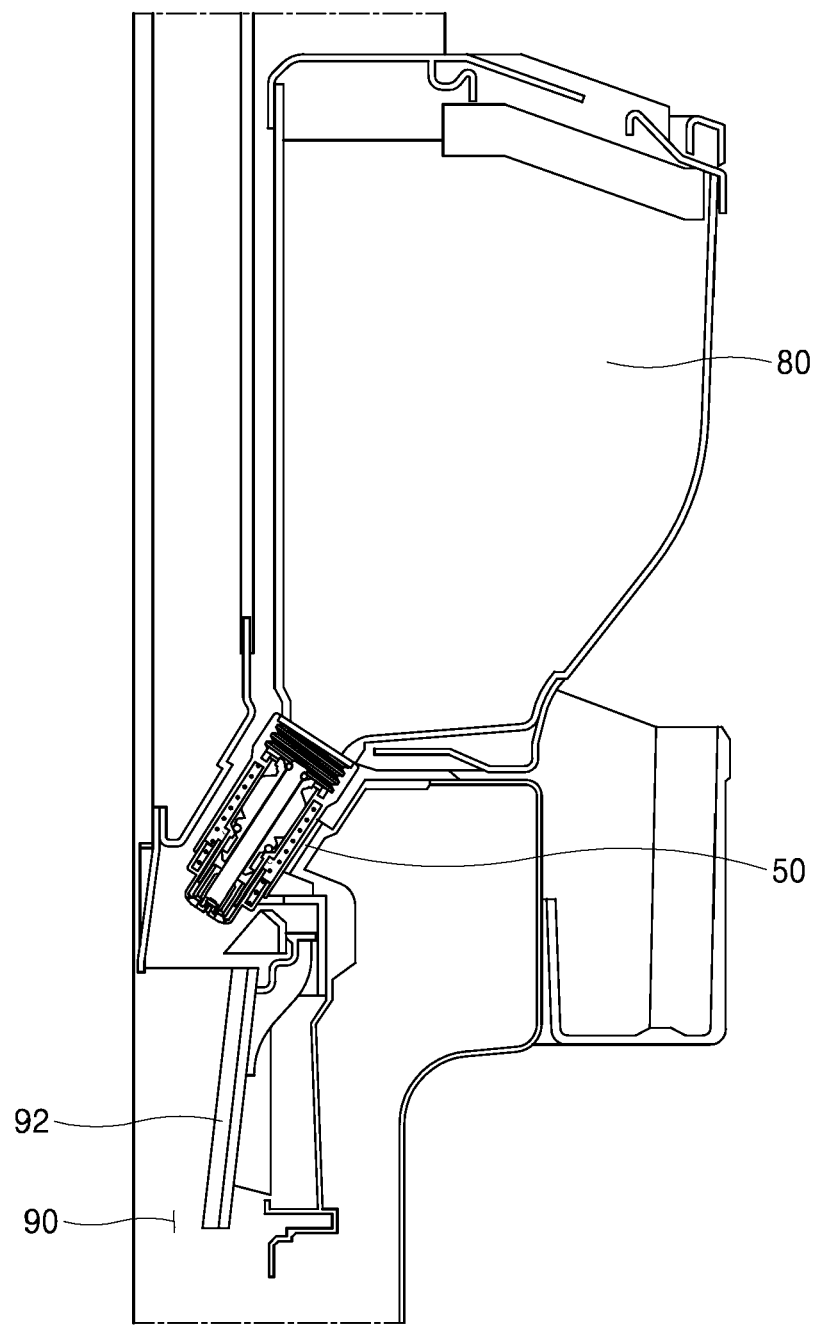
FIG. 4 is a cross-sectional view taken along a line A-A of FIG. 3.

As seen in FIGS. 3 and 4, water stored in a refrigerator may be kept in a water tank 80, and the water tank 80 may be detachably provided in the refrigerator door 90. The water tank 80 may be provided on a rear surface of a door panel and located in an upper portion of a water discharging space accessible from the outside of the door.

A water valve 50 may be provided in or at a lower end portion of the water tank 80. The water valve 50 may be inclined downward toward the front side from the lower end of the water tank 80. A water intake lever 92 may be provided in the water intake space. For example, when a user places a cup in the water intake space and pushes the water intake lever 92 by a rear surface of the cup, a force pressing the water intake lever 92 may be mechanically transferred to the water valve 50, and thus, the water valve 50 may be opened and then the water stored in the water tank 80 is discharged through a leading end portion of the water valve 50.

As described later with reference to FIGS. 5 to 11, the water valve 50 may include a pipe part (or pipe) 10 through which water may pass and a valve body 30 inserted into a leading end of the pipe part 10. When the water intake lever 92 is pressed, the force pressing the water intake lever 92 may be transferred to the valve body 30. As the valve body 30 is pressed as above, an opening/closing surface (or inclined surface) 51 of the water valve 50 may be opened.

Figure 5:
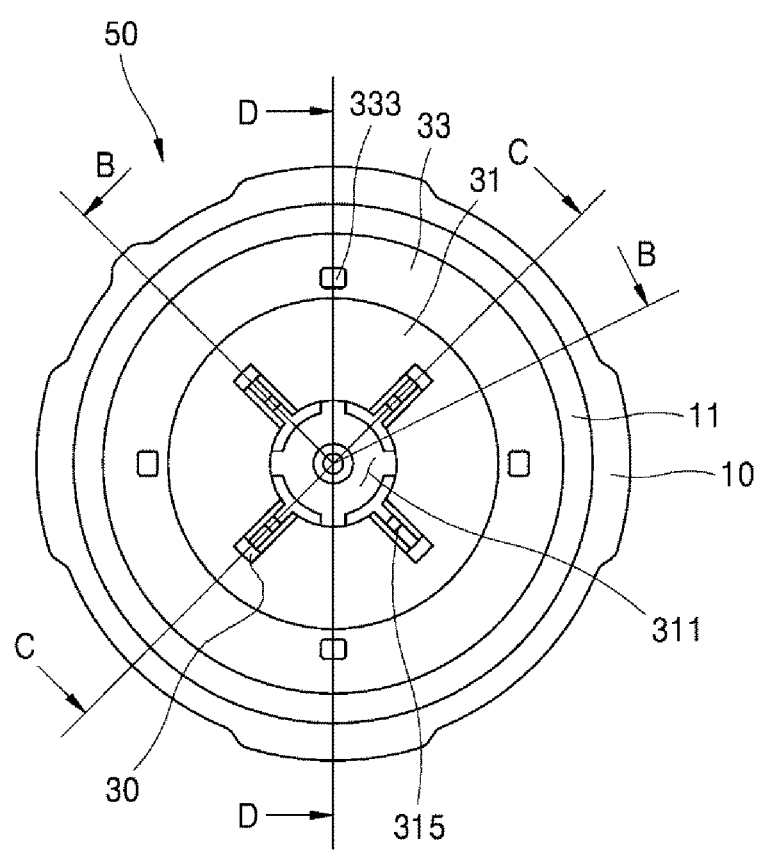
FIG. 5 illustrates a water valve according to the present disclosure, viewed from an end portion of the water valve.
Figure 6:
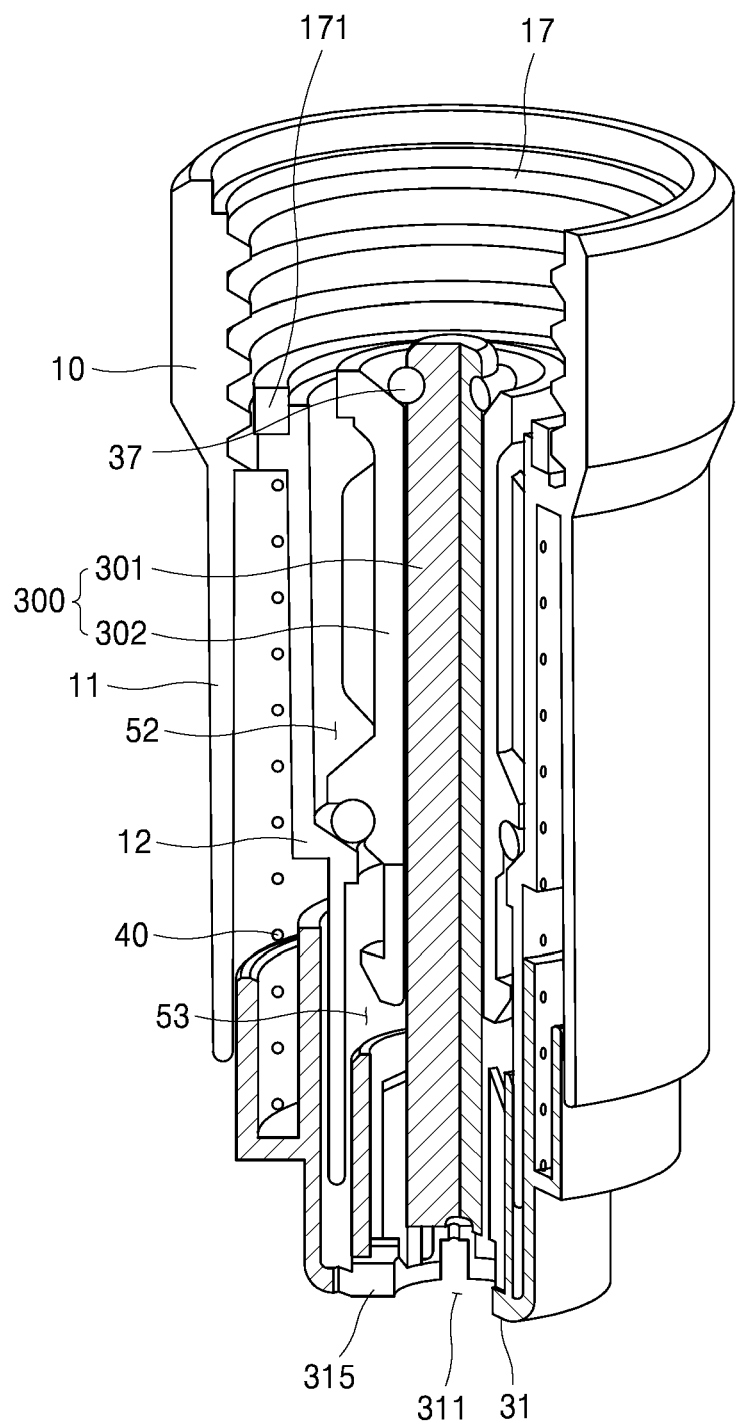
FIG. 6 is a cross-sectional view taken along a line B-B of FIG. 5 when the water valve is closed.
Figure 7:
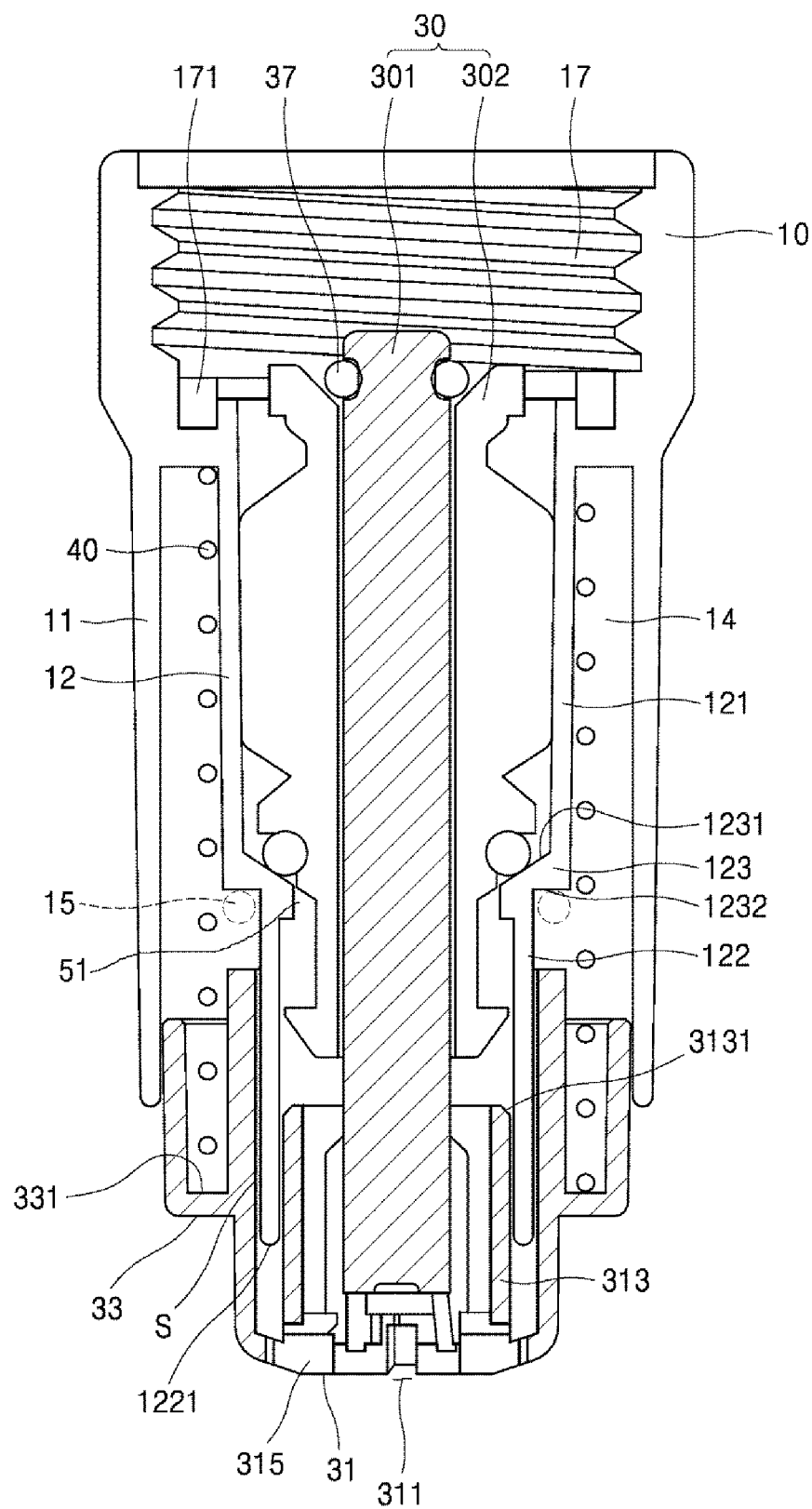
FIG. 7 is a cross-sectional view taken along a line C-C of FIG. 5 when the water valve is closed.
Figure 8:
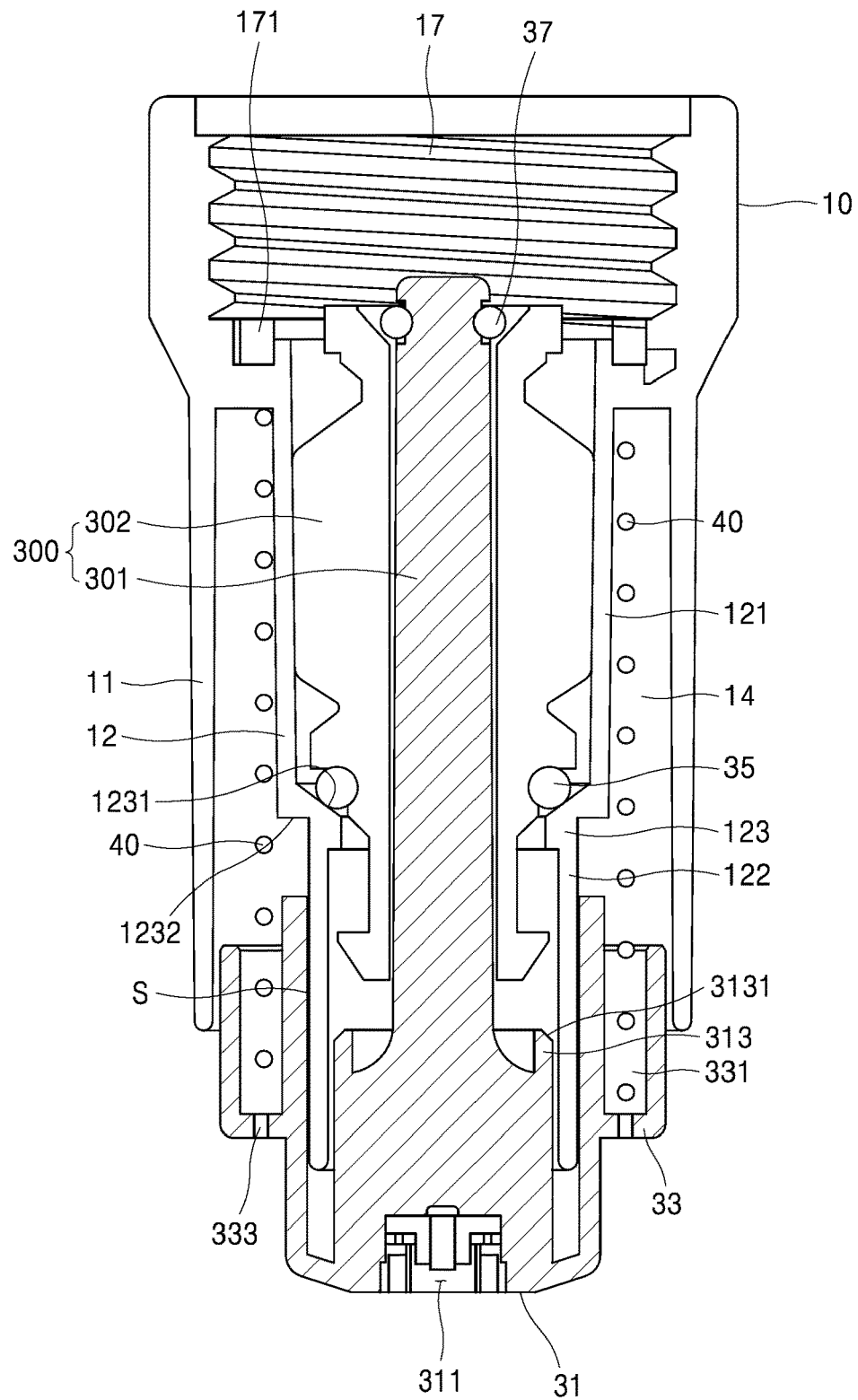
FIG. 8 is a cross-sectional view taken along a line D-D of FIG. 5 when the water valve is closed.
Figure 9:
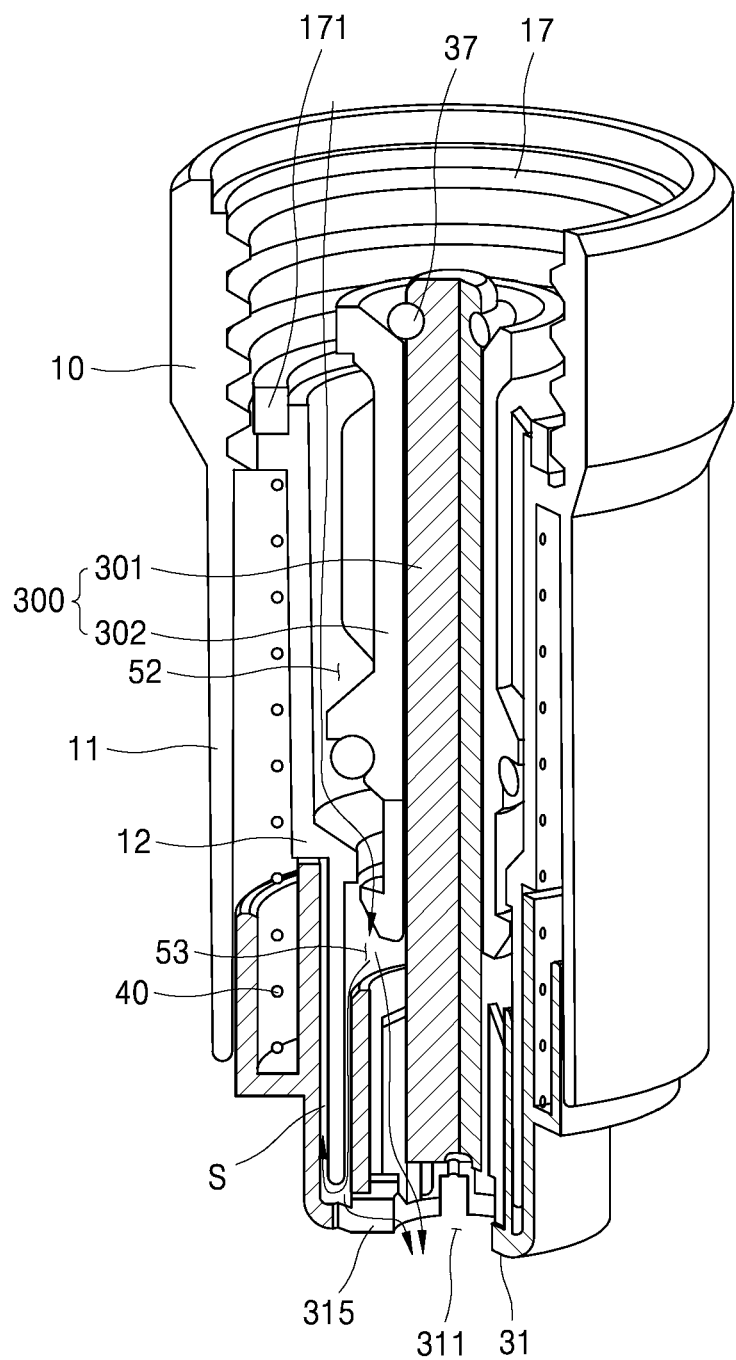
FIG. 9 is a cross-sectional view taken along a line B-B of FIG. 5 when the water valve is opened.
Figure 10:
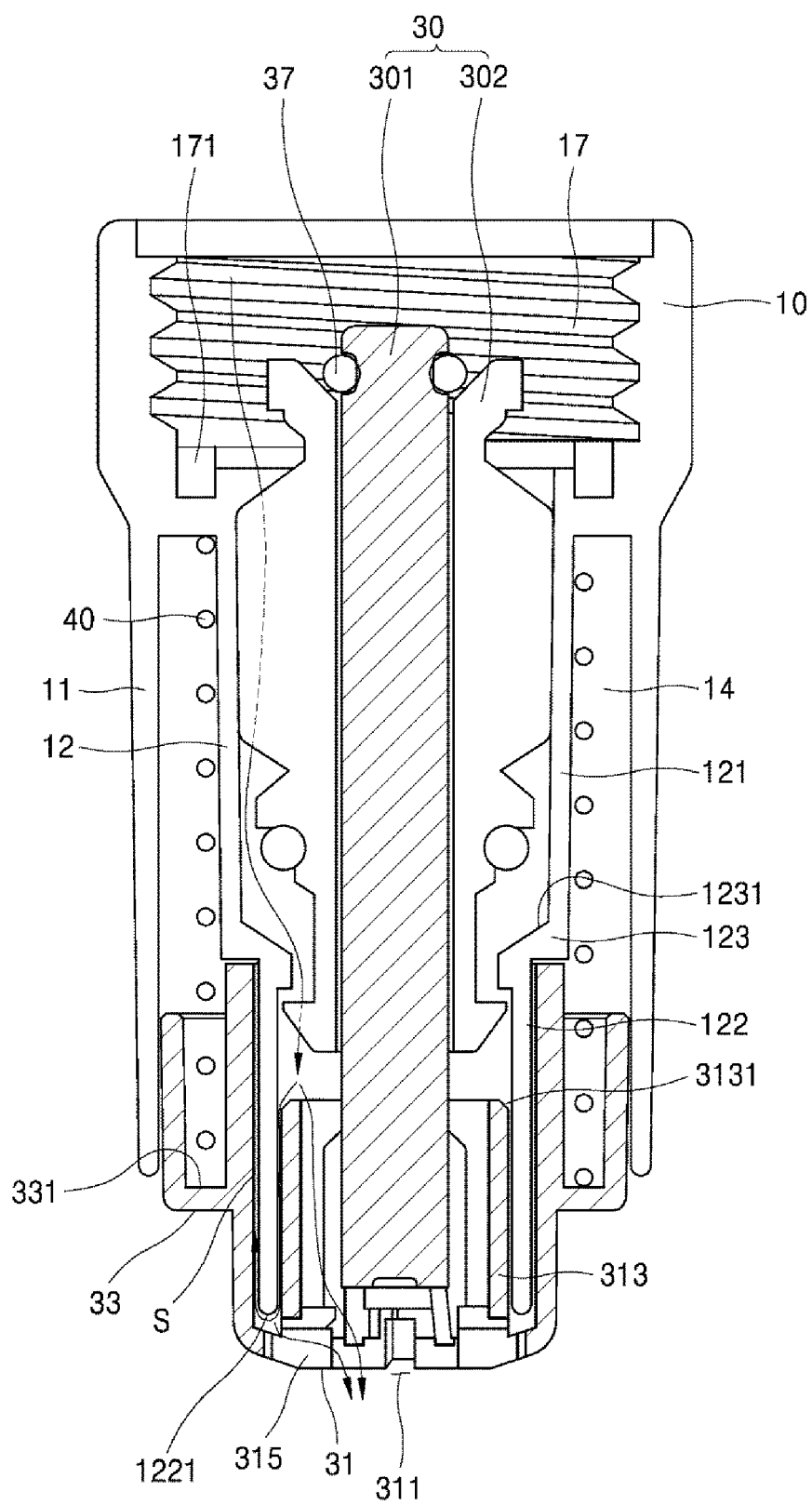
FIG. 10 is a cross-sectional view taken along a line C-C of FIG. 5 when the water valve is opened.
Figure 11:
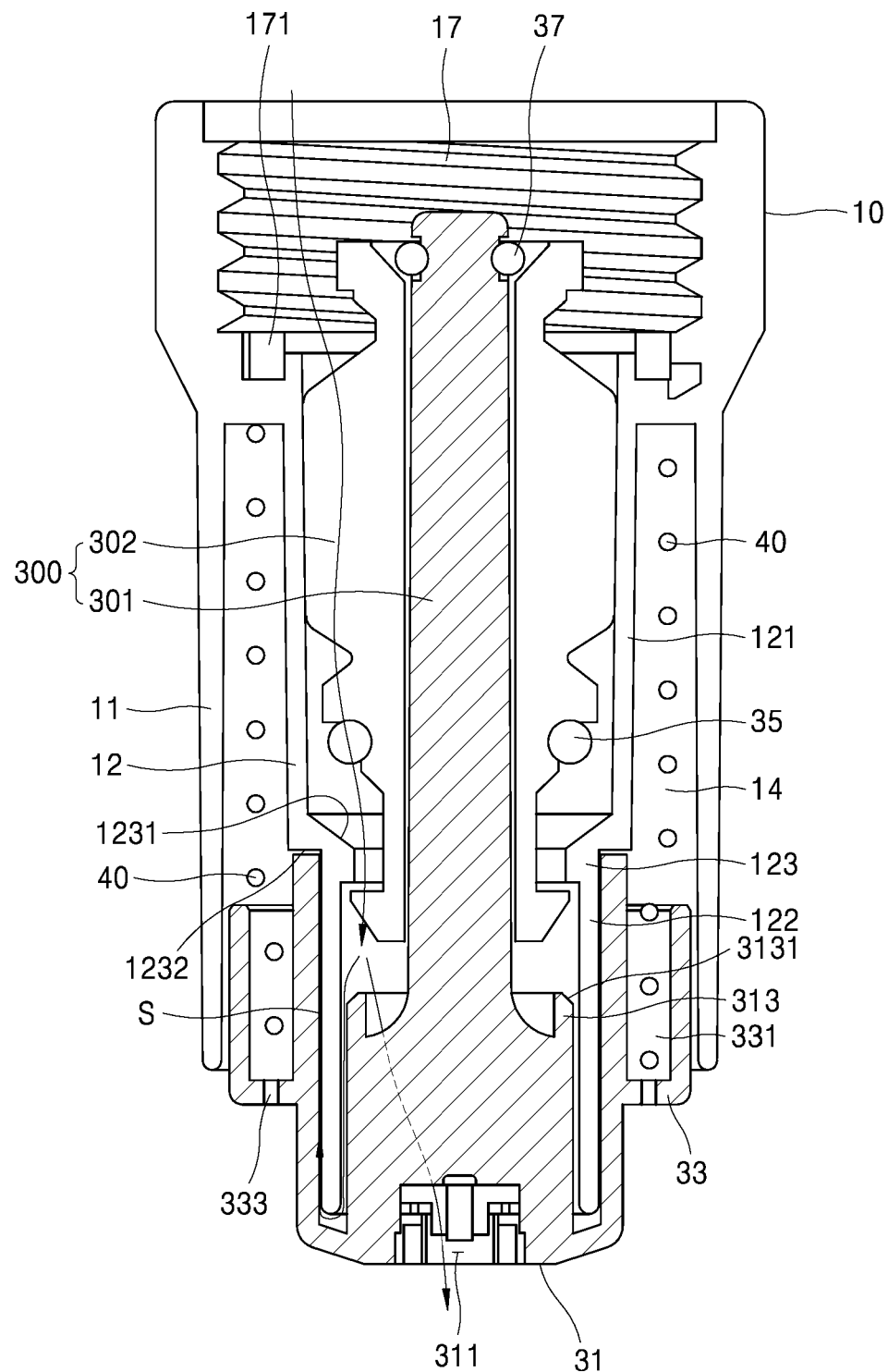
FIG. 11 is a cross-sectional view taken along a line D-D of FIG. 5 when the water valve is opened.

FIG. 5 illustrates the water valve 50 according to the present disclosure, viewed from the end portion of the water valve 50. FIG. 6 is a cross-sectional view taken along a line B-B of FIG. 5 when the water valve 50 is closed. FIG. 7 is a cross-sectional view taken along a line C-C of FIG. 5 when the water valve 50 is closed. FIG. 8 is a cross-sectional view taken along a line D-D of FIG. 5 when the water valve 50 is closed. FIG. 9 is a cross-sectional view taken along a line B-B of FIG. 5 when the water valve 50 is opened. FIG. 10 is a cross-sectional view taken along a line C-C of FIG. 5 when the water valve 50 is opened. FIG. 11 is a cross-sectional view taken along a line D-D of FIG. 5 when the water valve 50 is opened.

Referring to FIGS. 5 to 11, the water valve 50 of the present disclosure may include the pipe part 10 through which water of the water tank 80 flows, and the valve body 30 provided at the leading end of the pipe part 10. A coupling part (or coupler) 17 may be provided at an end portion of the pipe part 10 upstream of a water flow, or at an end portion opposite to the end portion where the valve body 30 is provided or the upper side of FIGS. 6 to 11.

The coupling part 17 may have a female thread formed in an inner surface of the end portion upstream of the pipe part 10, and a pressing ring 171 having a rectangular cross-section may be provided at an innermost side of the coupling part 17. If the pressing ring 171 has a rectangular cross-section, the pressing ring 171 may form a seal with an end portion of a drain hole 81 of the water tank 80 described later with reference to FIGS. 12 and 13 when the drain hole 81 and the coupling part 17 of the pipe part 10 are coupled to each other, even though there may be differences in the dimensions and shape of the drain hole 81 of the water tank 80.

An inner wall 12 may extend along the inner side of the pressing ring 171. An inner space of the inner wall 12 may be connected to an inner space of the drain hole 81 to be described later, upstream of the water flow. In other words, the inner space of the drain hole 81 forming a seal with the pressing ring 171 may be connected to the inner wall 12 of the pipe part 10. The inner wall 12 may be open downstream of the water flow.

An outer wall 11 having a diameter greater than the inner wall 12 may be provided outside the inner wall 12. A hollow portion 14 defined by a specific interval between the inner wall 12 and the outer wall 11 may be open toward the end portion of the pipe part 10 similar to the end portion of the inner wall 12.

The inner wall 12 may be divided into a first inner wall 121 provided upstream of a radial decreasing part (or funnel surface) 123 and a second inner wall 122 provided downstream of the radial decreasing part 123. An inner diametric section of the first inner wall 121 may be larger than an inner diametric section of the second inner wall 122 with respect to the radial decreasing part 123 of the inner wall 12.

A section of an inner wall portion (inner wall) of the first inner wall 121 may be substantially maintained constant along a lengthwise direction of the pipe part 10 (the section of the inner wall portion of the first inner wall 121 may have a very slightly inclined surface to facilitate taking out a molding from a mold during injection molding). Since the section of the inner wall portion of the first inner wall 121 is substantially constant, the section of the inner wall portion of the first inner wall 121 may have a shape suitable for guiding a slide motion of the valve body 30 in cooperation with a second valve body 302 of the valve body 30 to be described later.

The inner wall portion of the radial decreasing part 123 may have an inclined surface or tapered surface having a diameter that gradually decreases downstream along the lengthwise direction of the pipe part 10. This may allow the inner wall portion of the radial decreasing part 123 to very closely contact an opening/closing ring (or O-ring) 35 of the valve body 30 to be described later. An opening/closing surface (or inclined surface) 51 of the water valve 50 according to the present embodiment may be provided on the above-described inclined surface closely contacting the opening/closing ring 35.

An end portion (or end) 1221 of the second inner wall 122 may have a round shape. Water guided by a rib 313 of the valve body 30 to be described later and intruding into a gap between the rib 313 and the inner wall portion of the second inner wall 122 may smoothly flow along the round end portion of the second inner wall 122 into a gap between an outer wall portion (outer wall) of the second inner wall 122 and an outer insertion part 33 of the valve body 30.

A section of the outer wall portion of the second inner wall 122 may be substantially maintained constant along the lengthwise direction of the pipe part 10 (the section of the outer wall portion of the second inner wall 122 may have a very slightly inclined surface to facilitate taking out a molding from a mold during injection molding). Furthermore, a section of the inner wall portion (inner wall) of the outer insertion part 33 of the valve body 30 to be described later may be substantially maintained constant along the lengthwise direction of the pipe part 10 (the section of the inner wall portion of the outer insertion part 33 of the valve body 30 may have a very slightly inclined surface to facilitate taking out a molding from a mold during injection molding).

In other words, regardless of the position of the valve body 30 with respect to the pipe part 10, an interval between an outer circumferential surface of the second inner wall 122 and an inner circumferential surface of the outer insertion part 33 may be maintained almost constant. In the water valve 50 according to the present embodiment, a water film may be formed in the interval and thus water film sealing may be established.

A step portion (or step) 1232 may be formed on an outer wall portion of the radial decreasing part 123. As described later, an external insertion ring 15 may be selectively inserted in a portion where the second inner wall 122 and the step portion 1232 meet. In other words, the external insertion ring 15 may be inserted in an appropriate portion, as necessary.

The outer insertion part 33 of the valve body 30 to be described later may be inserted in a space between the second inner wall 122 and the outer wall 11. An elastic body 40 such as a coil compression spring may be inserted and accommodated in the hollow portion 14 that is defined by the inner wall 12 and the outer wall 11. As a section of an inner wall portion around the end portion of the outer wall 11 is maintained constant along the lengthwise direction of the pipe part 10, the inner wall portion of the outer wall 11 may face an outer circumferential surface of the outer insertion part 33 of the valve body 30 and thus guide the outer insertion part 33 moving along the lengthwise direction of the pipe part 10 with respect to the hollow portion 14.

The valve body 30 may be inserted in the pipe part 10, slide along the lengthwise direction of the pipe part 10, and open/close the opening/closing surface 51. The valve body 30 may be manufactured as two or more separate parts for assembly with the pipe part 10 and then the two separate parts may be coupled to each other in an assembly process with the pipe part 10. In the present disclosure, a configuration of manufacturing two separate parts of a first valve body 301 and the second valve body 302 is presented.

For example, the second valve body 302 may be inserted toward the first inner wall 121 through the coupling part 17 of the pipe part 10, and the first valve body 301 may be inserted toward the second inner wall 122 from the end portion of the pipe part 10. Accordingly, the two valve body parts 301 and 302 inserted in the pipe part 10 may be coupled to each other. A gap formed as the two valve body parts 301 and 302 are assembled may be sealed by a coupling ring 37.

The second valve body 302 may have two or more wings protruding in a radial direction, and an end portion of each wing may guide sliding of the valve body 30 in cooperation with an inner wall surface of the first inner wall 121. The opening/closing ring 35 may be inserted around the second valve body 302 at a position facing an inclined surface 1231 of the radial decreasing part 123 so as to contact the inclined surface 1231, thereby contacting the opening/closing surface 51.

The end portion of the valve body 30 covering an open portion of the end portion of the pipe part 10 may include a cover surface 31 covering the end portion, the rib 313 inwardly extending along the lengthwise direction of the pipe part 10 from the inside of the inner wall 12 of the pipe part 10, and the outer insertion part 33 inwardly extending along the lengthwise direction of the pipe part 10 between the inner wall 12 and the outer wall 11. The cover surface 31 may cover a flow section defined by the second inner wall 122 of the pipe part 10, and may have a generally flat shape. A water passing hole 311 through which water is discharged may be provided at a center portion of the cover surface 31.

The rib 313 may extend on a rear surface of the cover surface 31 along the lengthwise direction of the pipe part 10. The rib 313 may be provided at an inner side of the second inner wall 122 of the pipe part 10. A certain gap may exist between an outer diametric portion of the rib 313 and an inner diametric portion of the second inner wall 122, and the water intruding into the gap between an end portion of the rib 313 and the outer diametric portion of the rib 313 may intrude into the gap. To increase an amount of water intruding into the gap, an inclined surface 3131 that is tapered such that a section thereof gradually decreases toward the end portion may be provided at least the end portion of the outer circumferential surface of the rib 313.

The rib 313, for example, may have any shape capable of smoothly supplying water to a gap portion provided between the second inner wall 122 of the pipe part 10 and the outer insertion part 33 that is described later. For example, the rib 313 may have a shape like a circumferential surface of a truncated cone having a diameter gradually decreasing toward the end portion.

The outer insertion part 33 may extend from a rear surface of the circumference portion of the cover surface 31 along the lengthwise direction of the pipe part 10. The outer insertion part 33 may be located at an outer side of the rib 313, and the second inner wall 122 of the pipe part 10 may be interposed between the outer insertion part 33 and the rib 313. A certain gap may exist between an inner circumferential surface of the outer insertion part 33 and an outer circumferential surface of the second inner wall 122. The gap may be an interval such that water may flow upward by a capillary phenomenon, and may be determined within an interval range in which the water filling the gap can surely form a water film.

Also, the end portion 1221 of the second inner wall 122 may have a round shape. This may facilitate the water intruding into the gap between the rib 313 and the inner wall surface of the second inner wall 122 to further smoothly flow back into the space between an outer wall surface of the second inner wall 122 and an inner wall surface of the outer insertion part 33.

When a pressure of the water intruding into the space between the outer wall surface of the second inner wall 122 and the inner wall surface of the outer insertion part 33 is high due to the shapes of the rib 313 and the end portion 1221 of the second inner wall 122, beyond forming a water film, the water may flow upward to the end of the space between the outer wall surface of the second inner wall 122 and the inner wall surface of the outer insertion part 33 to overflow toward the hollow portion 14. The water overflowing toward the hollow portion 14 may flow out through an air vent 333 in an accommodation groove 331 of the outer insertion part 33 or a gap between the outer circumferential surface of the outer insertion part 33 and an inner circumferential surface of the outer wall 11.

The present disclosure may further include a drain passage to release the pressure of water intruding into the space between the outer wall surface of the second inner wall 122 and the inner wall surface of the outer insertion part 33. The drain passage may be a cut portion (or notch) 315 that penetrates through the cover surface 31 between the rib 313 and the outer insertion part 33 and is connected to the water passing hole 311 of the cover surface 31. In other words, the cut portion 315 may have a function of releasing the pressure of water concentrating in the space between the rib 313 and the outer insertion part 33. The cut portion 315 illustrated in FIGS. 5 to 7 and FIGS. 9 and 10 may be connected to the external space of the water valve 50 under an atmospheric environment to release the pressure of an inner space. Also, a small amount of water discharged through the cut portion 315 may be joined to a stream of water discharged through the water passing hole 311, thereby discharged as one stream of water.

In FIG. 5, four cut portions 315 are radially provided and each of the cut portions 315 has a narrow width so that each of the cut portions 315 is formed thin and long. The width of the cut portion 315 may be narrow enough not to break a surface tension or cohesion force of the water remaining in the front-room portion 53 when the water film sealing S is formed at the gap portion, which may be an upper limit of the width of the cut portion 315. Also, each of the cut portions 315 may be wide enough to allow the water released from the space between the rib 313 and the outer insertion part 33 through the cut portion 315 to at least join the mainstream of the water passing hole 311, which may be a lower limit of the width of the cut portion 315.

Figure 1:
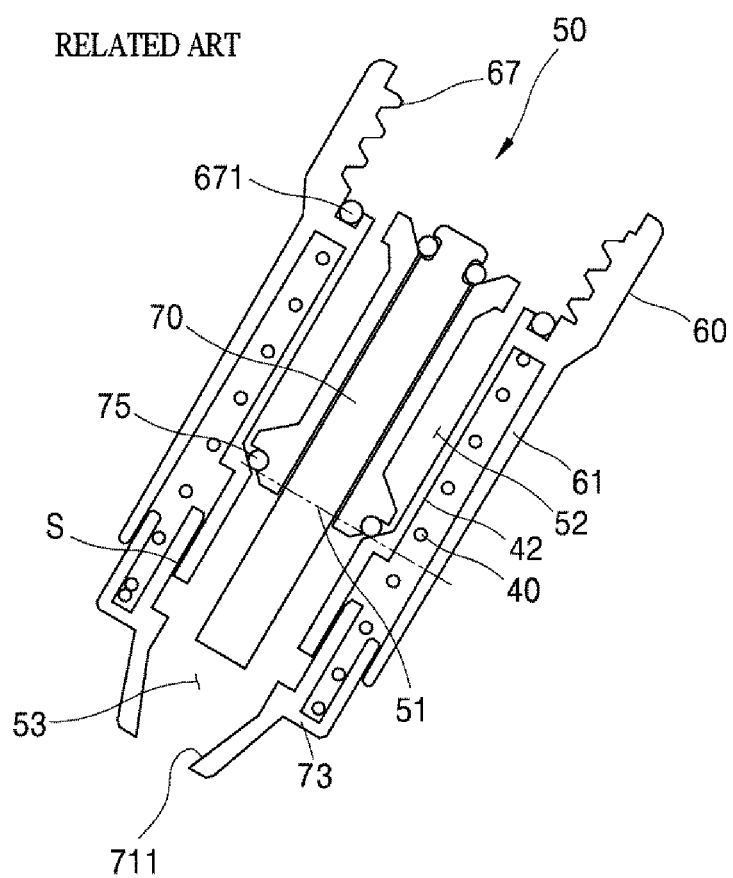
FIG. 1 is a cross-sectional view illustrating a water valve according to the related art in a closed position.
Figure 2:
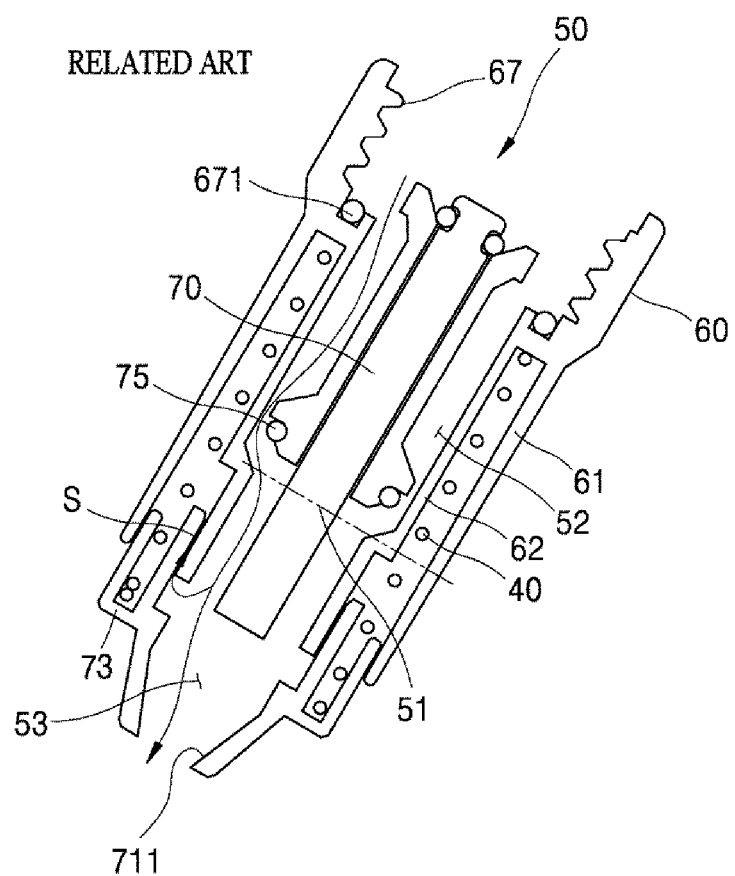
FIG. 2 is a cross-sectional view illustrating the water valve of FIG. 1 in an opened position.

As described above, the cover surface 31 of the valve body 30 according to the present disclosure may have an almost flat shape, which is quite different from the structure of the leading end portion of the valve body 70 according to the related art in FIGS. 1 and 2. In the present disclosure, the cover surface 31 around the water passing hole 311 may be planarized and thus the volume of the front-room portion 53 defined by an internal volume of the valve body 30 may be reduced. Accordingly, when the water valve 50 that has been opened is closed, the amount of water remaining in the front-room portion 53 may be reduced.

Furthermore, since an area of the rear surface of the cover surface 31 that is flat and the inner circumferential surface of the rib 313 (that is, a surface facing the volume portion of the front-room portion 53) is larger than compared to the volume of redundant water that is relatively small, the cohesion of the redundant water in the front-room portion 53 may be further increased. Accordingly, a phenomenon that the redundant water drips due to the weight of gravity may be definitely prevented.

The position, shape, and dimensions of the cut portion 315 may be variously changed within a range guaranteeing the function of the cut portion 315. In other words, the cut portion 315 may release the water pressure formed in the space between the rib 313 and the outer insertion part 33. The cut portion 315 may allow the water released from the space between the rib 313 and the outer insertion part 33 to release the water pressure and to join the mainstream. Accordingly, as far as the above functions are exerted, the position, shape, and dimensions of the cut portion 315 may be variously changed.

Figure 14:
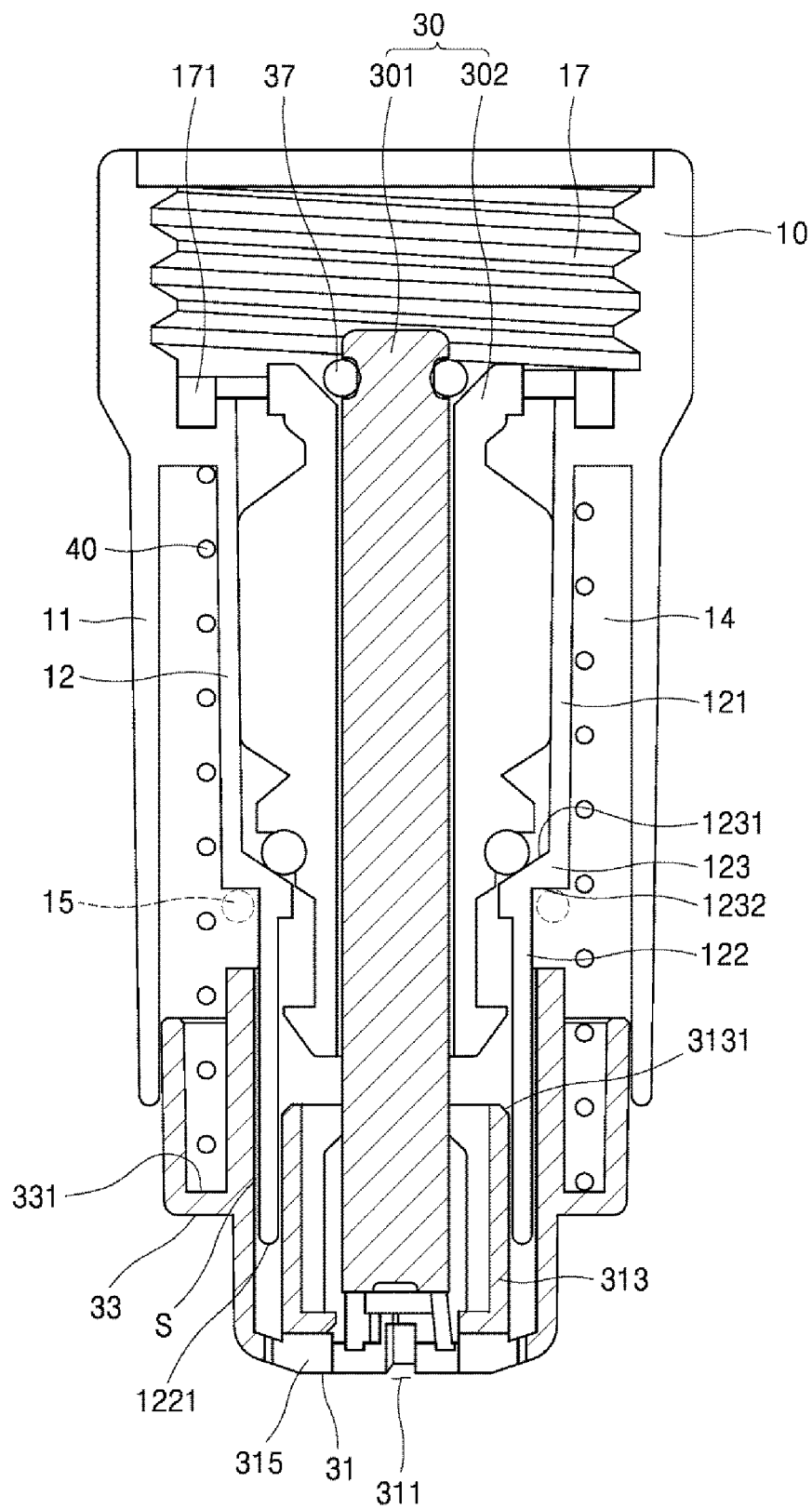
FIGS. 14 and 15 are cross-sectional views of water valves according to other embodiments of the present disclosure.
Figure 15:
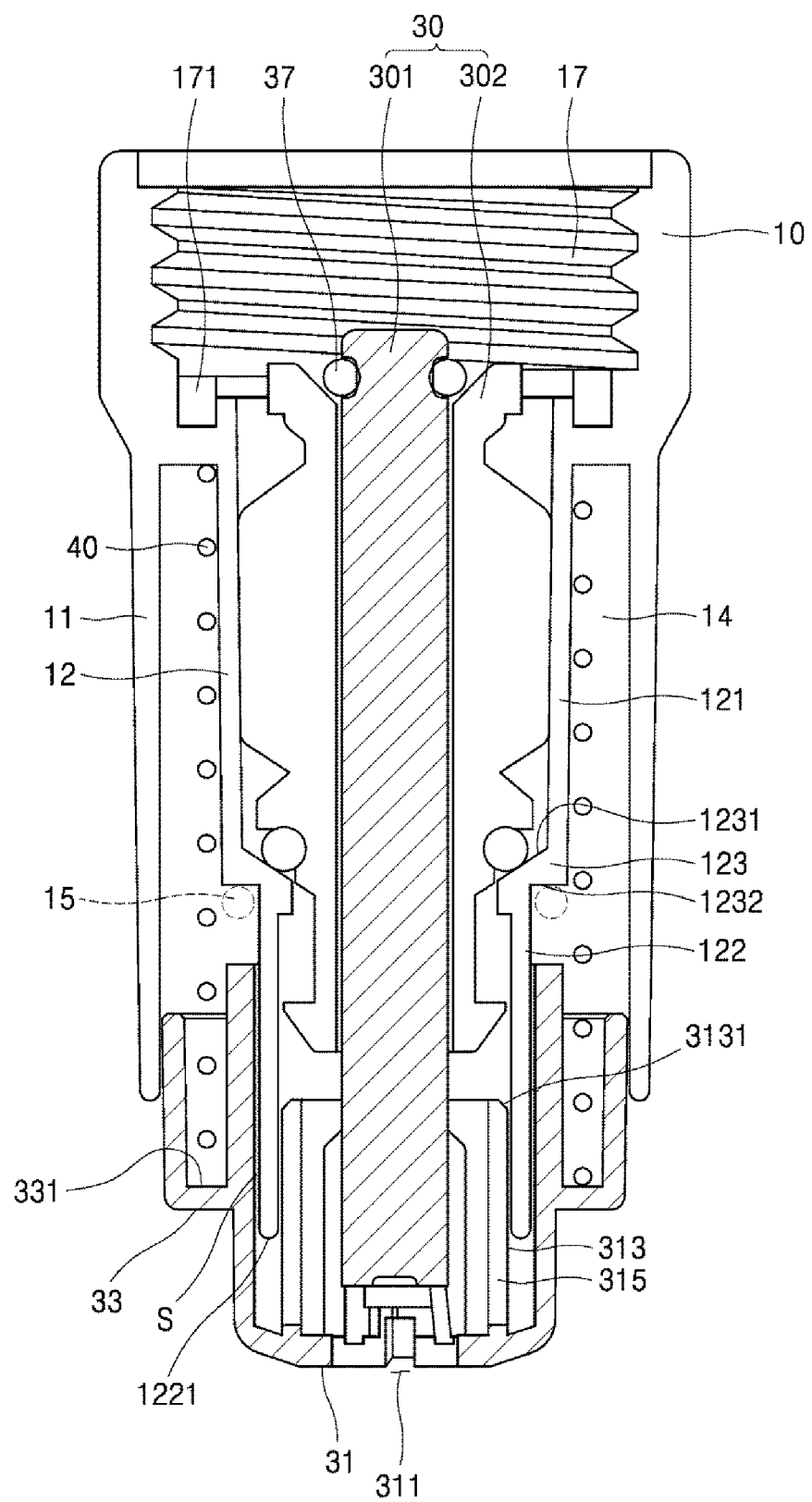

For example, FIGS. 14 and 15 illustrate modified examples adopting cut portions having different shapes. In FIG. 14, the cut portion 315 is cut to the cover surface 31 and to a lower end portion of the rib 313 connected to the cover surface 31, and the space between the rib 313 and the outer insertion part 33 is connected to the front-room portion 53 defined by an inner diametric portion of the rib 313 and also to the water passing hole 311. With the above structure, the cut portion 315 may release the water pressure formed in the space between the rib 313 and the outer insertion part 33 and to allow the water released from the space between the rib 313 and the outer insertion part 33 to join the mainstream.

Referring to FIG. 15, the cut portion 315 may be formed from the upper end of the rib 313 to near the cover surface 31, by which a space at the outer diameter of the rib 313 and a space at the inner diameter of the rib 313 may be connected to each other. Accordingly, the water pressure formed in the space between the rib 313 and the outer insertion part 33 may be released and the water released from the space between the rib 313 and the outer insertion part 33 may join the mainstream.

Referring back to FIG. 7, the external insertion ring 15 supported by the outer circumferential surface of the second inner wall 122 and the step portion 1232 may be further inserted on the outer circumferential surface of the second inner wall 122. The external insertion ring 15 may be additionally provided to prevent water from overflowing through the gap between the second inner wall 122 and the outer insertion part 33. However, the external insertion ring 15 is not necessarily added when the overflow phenomenon is prevented by the cut portion 315. When the external insertion ring 15 is inserted and the valve body 30 is inserted inside as illustrated in FIG. 10, the external insertion ring 15 may be supported by being inserted between the step portion 1232 and the end portion of the outer insertion part 33, forming a seal.

An operating principle of the water valve 50 is described below. As described above, the spring 40 that is an elastic body such as a compression coil may be provided in the hollow portion 14. The elastic body may elastically support the valve body 30 in a direction of pushing the valve body 30 against the pipe part 10. Accordingly, when a water intake lever 92 is not pushed in a normal state, the elastic body 40 may push the valve body 30 to a position illustrated in FIGS. 6 to 8.

The end portion of the elastic body 40 may be supported by the accommodation groove 331 and accordingly an elastic force of the elastic body 40 may push the outer insertion part 33 to the outside. Since the outer insertion part 33 integrally forms one body with the first valve body 301, the first valve body 301 may maintain a state of being pressed to the outside by the elastic force of the elastic body 40. Then, the force of the first valve body 301 may be transferred to the second valve body 302 via the coupling ring 37. In the process, the coupling ring 37 may be strongly and closely pressed between the first valve body 301 and the second valve body 302, sealing a gap between the two parts.

Accordingly, as the second valve body 302 is pressed to the outside, the opening/closing ring 35 of the second valve body 302 located around the inclined surface 1231 of the pipe part 10 may contact the inclined surface 1231, sealing the opening/closing surface 51.

When a user pushes the water intake lever 92, a force of pressing the water intake lever 92 by the user may be transferred to the valve body 30 and thus the valve body 30 may be pressed. In other words, the force of pressing the water intake lever 92 by the user overcomes the elastic force of the elastic body 40 to insert the valve body 30 toward the pipe part 10. Then, the opening/closing surface 51 may be opened and the water upstream 52 may flow down to the front-room portion 53 through the opening/closing surface 51. The water flowing into the front-room portion 53 may be discharged to the outside through the water passing hole 311.

Part of the water flowing in the front-room portion 53 may flow into the gap between the rib 313 and the second inner wall 122 by the rib 313 and the inclined surface 3131 formed on an outer circumferential surface of an upper end of the rib 313. The water flowing to the end portion of the second inner wall 122 may flow again into the gap portion between the outer surface of the second inner wall 122 and the outer insertion part 33 by the rounded end portion 1221 of the second inner wall 122.

The water flowing in as above may flow up along the gap portion by the capillary phenomenon, forming the water film sealing S. The water pressure in the space between the rib 313 and the second inner wall 122 may be released by the cut portion 315. The water pressure may be released as the water in the outer diametric portion of the rib 313 is released through the cut portion 315, and the released water may move along the cut portion 315 having a narrow width due to viscosity and thus join the mainstream of the water released through the water passing hole 311.

When the user who has completed the water intake removes the force to press the water intake lever 92, the valve body 30 may instantly slide by the elastic body 40 to the end portion of the pipe part 10, that is, to the outside. Then, the water valve 50 may return to the state of FIGS. 6 to 8. The front-room portion 53 may be sealed and isolated from the external space, except for the water passing hole 311. In other words, the opening/closing surface 51 may be sealed by the opening/closing ring 35, and a gap between the inner wall of pipe part 10 and the valve body 30 may be sealed by the water film S formed on the outer circumferential surface of the second inner wall 122 and the inner circumferential surface of the outer insertion part 33.

Accordingly, the water remaining in the front-room portion 53 may remain inside due to a tension and cohesion, despite gravity. In particular, according to the present disclosure, since the volume of the front-room portion 53 is small, but the area of the cover surface 31 and the rib 313 facing the front-room portion 53 is relatively large, the cohesion and tension of the redundant water may be induced to be greater.

Figure 12:
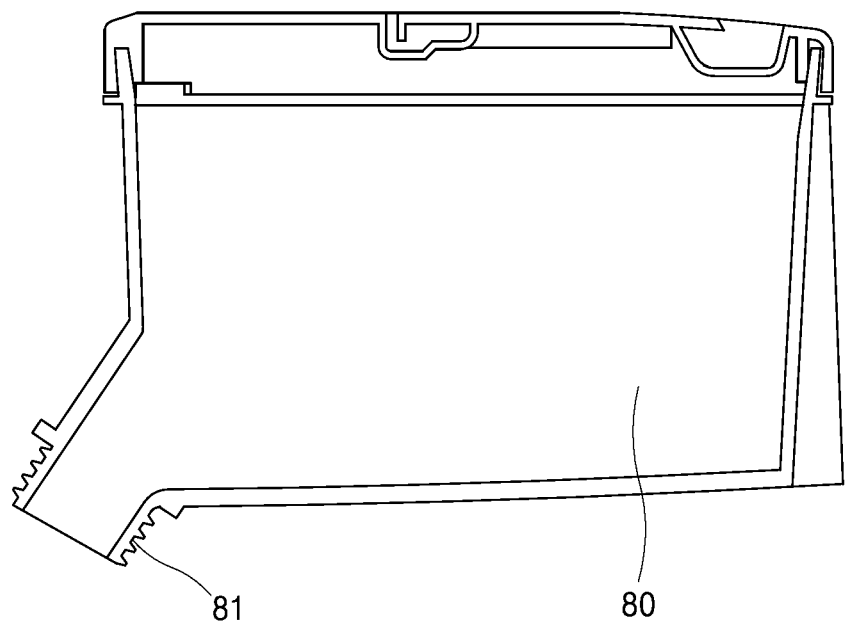
FIG. 12 is a side cross-sectional view of a configuration of a water tank.
Figure 13:
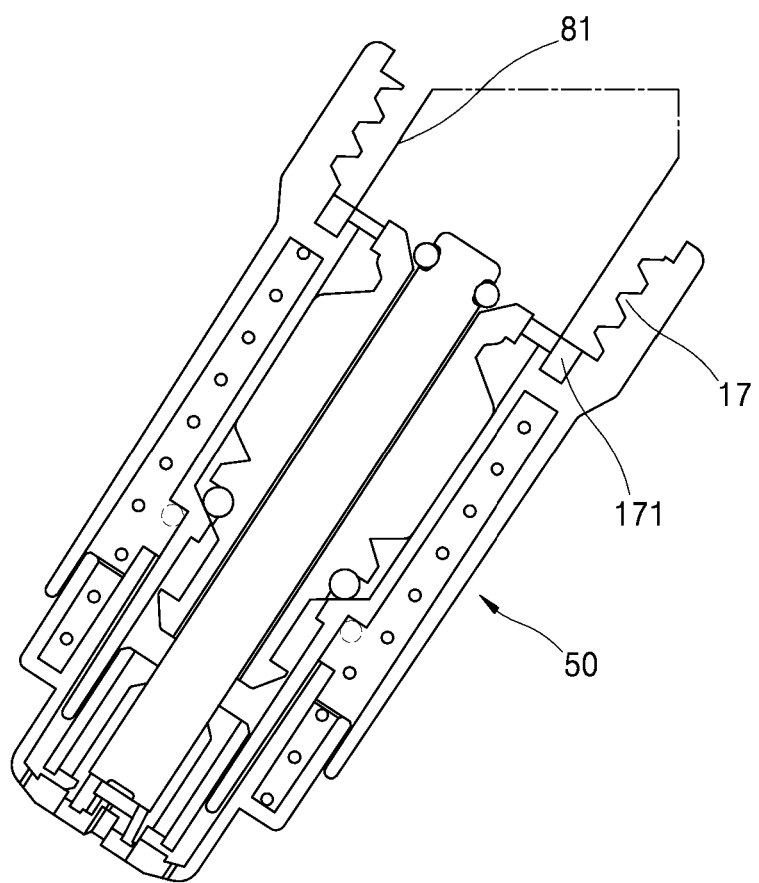
FIG. 13 is a side cross-sectional view showing that a water valve is coupled to a drain hole of the water tank of FIG. 12.

Referring to FIGS. 12 and 13, the water tank 80 may be provided at the refrigerator door 90 of the present disclosure as illustrated in FIG. 12. The drain hole 81 may be inclined downward at a lower end of the water tank 80, and when the water tank 80 is provided at the refrigerator door 90, the drain hole 81 may extend toward the water intake space, facing the front side of the door.

A male thread may be formed on the outer circumferential surface of the drain hole 81. The female thread of the coupling part 17 provided in the upper end of the pipe part 10 of the water valve 50 may be coupled to the male thread of the drain hole 81 to be screwed with each other. In the process, the end portion of the drain hole 81 may contact the pressing ring 171.

According to the present disclosure, since the pressing ring 171 has a rectangular cross-section and an effective contact area with the end portion of the drain hole 81 extends further, sealing may be formed even when the end portion of the drain hole 81 has slightly different size and shape. Accordingly, the pressing ring 171 may enable a common use of the water valve 50 with respect to water tanks and drain holes having different sizes.

Also, as described above, in the present disclosure, since a pressure of water in a space between a rib and an outer insertion part is released by means of a cut portion or a cut groove, despite a difference in the water pressure according to the capacity of a water tank and a water level difference, a water film sealing may be formed in a gap portion between the outer insertion part and a pipe part. Accordingly, a water valve may be commonly used regardless of the capacity and size of a water tank.

Although the water valve is vertically provided, it may be provided in an inclined direction as illustrated in FIGS. 5, 12, and 13. Considering the above, two or more cut portions, preferably, four or more cut portions may be provided in a radial direction. In other words, in a structure of coupling a coupling part and the drain hole 81 by threaded connection, considering that an angle of the water valve rotating for coupling may be various, in an embodiment, four cut portions may be arranged at intervals of 90 degrees.

According to the present disclosure, since water film sealing is formed with respect to the front-room portion provided by the pipe part and the valve body, water remaining in the front-room portion after the opening/closing room of the water valve is closed may be prevented from dripping through the water passing hole. Furthermore, according to the present disclosure, while water is supplied smoothly and at an appropriate pressure to the gap portion between the pipe part and the valve body where the water film is formed, a phenomenon that the water overflows through the gap portion may be prevented.

Furthermore, according to the present disclosure, since the water released through the cut portion that is provided to release the pressure of water supplied to the gap between the pipe part and the valve body where the water film is formed is joined to the mainstream discharged through the water passing hole, the water discharged from the pipe part may be discharged as one stream of water. Furthermore, according to the present disclosure, since allowable tolerance of the gap for forming the water film between the valve body and the pipe part may be increased, a defective rate occurring during a manufacture process may be reduced.

Furthermore, according to the present disclosure, since the forming of the water film in the gap portion is less sensitive to a difference in the size of the water tank or the water pressure, the water valve may be commonly used for products having different water tanks and water pressures and thus part management load, logistics management load, or production costs may be reduced. Furthermore, according to the present disclosure, the water valve may be coupled to the drain hole to form a seal, regardless of the shape or size of the end portion of the drain hole coupled to the water valve. Furthermore, according to the present disclosure, a defect such as a redundant water flow generated by the water valve may be prevented and thus a product value may be greatly improved.

Objects of the present disclosure are not limited to the above-described, and other objects and advantages can be appreciated by those skilled in the art from the following descriptions. Further, it will be easily appreciated that the objects and advantages of the present disclosure can be practiced by means recited in the appended claims and a combination thereof.

The present disclosure provides a valve body structure, in which a rib for guiding a flow of water toward a portion where a water film is to be formed between a pipe part and a valve body in a front-room portion may be provided at the valve body and a cut portion for releasing a water pressure even when the flow of water excessively concentrates is provided, and thus, the water flowing through the cut portion may join a mainstream of the water discharged through a water passing hole.

A valve body may be provided at an end portion of a pipe part connected to a space where water is stored and serve as a path through which the water is discharged and open/close an opening/closing surface by sliding along a lengthwise direction of the pipe part. The valve body may include a cover surface having a water passing hole through which the water is discharged and at least partially covering a leading end surface of the pipe part, a rib inwardly extending from the cover surface toward an inner space of the pipe part, an outer insertion part extending from the cover surface toward the pipe part and having a predetermined gap with an outer circumferential surface of the pipe part, and a cut portion connecting a space between the outer insertion part and the rib to other space to release a pressure of water applied between the outer insertion part and the rib.

The cut portion may be formed by cutting the cover surface, the rib, or at least a part of the cover surface and the rib and may connect an outer diametric space of the rib to at least any one of an inner diametric space of the rib and the water passing hole. The rib may guide the water to flow toward a gap portion defined by an outer circumferential surface of the pipe part and an inner circumferential surface of the external insertion part of the valve body so that the water may be surely supplied to the gap portion. Also, a pressure of the guided water may be released by the cut portion so that the pressure of the water supplied to the gap may be maintained at an appropriate level.

The cut portion may be provided at least at the cover surface to connect the outer diametric space of the rib and the water passing hole. Accordingly, the water discharged through the cut portion may join a mainstream of the water flowing through the water passing hole. The cut portion may be provided at least the cover surface and a rib portion connected to the cover surface and may connect an outer diametric space of the rib, the water passing hole, and an inner diametric space of the rib to one another. Accordingly, the water discharged through the cut portion may join a mainstream of the water flowing through the water passing hole or in the front-room portion.

The cut portion may be provided from a longitudinal end of the rib to near the cover surface and connect an outer diametric space of the rib and an inner diametric space of the rib. Accordingly, the water discharged through the cut portion may join the mainstream of the water in the front-room portion.

An outer circumferential surface of the rib may be perpendicular from the cover surface or may include an area that decreases toward a center axis of the pipe part as the area is spaced far from the cover surface. Accordingly, such a shape or a structure may strongly guide the water to flow toward a gap portion where a water film is may be formed so that the water may be surely supplied to the gap portion.

At least a portion of the cover surface around the water passing hole may be a flat portion that is substantially perpendicular to an axial direction of the pipe part. Accordingly, the volume of the front-room portion defined by the inner circumferential surface of the rib and an inner wall of a portion around the water passing hole may be reduced. Also, an area of the inner wall facing an inner volume portion of the front-room portion may be increased to be larger than the relatively smaller volume of the front-room portion, and thus the cohesion of the redundant water in the front-room portion may be further increased.

A water valve may include the above-described pipe part and valve body. A section of a leading end portion of the pipe part may be rounded. Accordingly, as the leading end portion of the pipe part surrounded by the rib, the cover, and the external insertion part is rounded, the water coming through a gap between the rib and the pipe part may be guided to further smoothly flow through the gap between the pipe part and the external insertion part via the cover surface.

An external insertion ring may be provided on an outer circumferential surface of the pipe part, the external insertion ring contacting the outer insertion part of the valve body as the valve body slides. Accordingly, when the external insertion part of the valve body contacts the external insertion ring forming a seal, a redundant water overflow phenomenon that may occur through the gap may be prevented.

A radial decreasing part may be provided around the opening/closing surface of the pipe part, the external insertion ring may be inserted in a portion having a diameter decreased by the radial decreasing part, and the external insertion ring may be supported by the radial decreasing part. Accordingly, the external insertion ring may be conveniently provided and surely supported.

A coupling part that is coupled to an end portion of a drain hole connected to the space where the water is stored may be provided at the end portion of the pipe part in a direction opposite to a direction in which the valve body is provided. Accordingly, the pipe part and the valve body may be modularized.

A pressing ring may be provided at the coupling part and forming a seal with the end portion of the drain hole, and a section of the pressing ring may be substantially rectangular. Accordingly, even when the shape or dimensions of the end portion of the drain hole of the water tank coupled to the coupling part slightly differs, sealing may be formed and a modularized water valve may be further facilitated to be commonly used.

The pipe part may include an inner wall facing an inner circumferential surface of the outer insertion part and an outer wall facing an outer circumferential surface of the outer insertion part, and the inner wall and the outer wall may be opened toward the leading end and the outer insertion part may be inserted in the lengthwise direction along a space between the inner wall and the outer wall.

A refrigerator may include a water tank and a water valve connected to the water tank and serving as a path through which water is discharged. The pipe part and the valve body may be provided at a door of the refrigerator, a water intake lever may be further provided at the door, and a force pressing one side of the water intake lever may be transferred to the valve body to allow the valve body to open the opening/closing surface of the pipe part. Accordingly, the water valve may be opened by pressing the water intake lever so as to take water.

The pipe part may be detachably provided at the water tank. Accordingly, replacement or maintenance and repair may be made easy.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A valve body provided at an end portion of a nozzle and configured to control dispensing of liquid by sliding along a lengthwise direction of the nozzle, the valve body comprising:
   an outlet end at least partially covering a leading end surface of the nozzle and having a water passing hole formed at the outlet end through which the liquid is discharged;
   an outer insertion wall that extends from the outlet end toward the nozzle, provided outside an outer circumferential surface of an inner wall of the nozzle, and spaced from the outer circumferential surface of the inner wall of the nozzle by a predetermined distance;
   a tube that extends from the outlet end toward an inner space of the nozzle, the tube configured to guide a portion of a flow of liquid from the nozzle toward a space between the nozzle and the outer insertion wall; and
   an opening formed at the outlet end, the tube, or at least a part of the outlet end and the tube, the opening being configured to connect a space between the outer insertion wall and the tube to at least one of an inner space of the tube or the water passing hole to allow release of pressure in the space between the outer insertion wall and the tube formed by the liquid guided by the tube.

2. The valve body of claim 1, wherein the opening is provided at least at the outlet end and connects a space between the outer insertion wall and the tube and the water passing hole.

3. The valve body of claim 1, wherein the opening is provided at least at the outlet end and a portion of the tube connected to the outlet end and connects the space between the outer insertion wall and the tube, the water passing hole, and an inner space of the tube to one another.

4. The valve body of claim 1, wherein the opening is provided from an end of the tube to around the outlet end and connects the space between the outer insertion wall and the tube and an inner space of the tube.

5. The valve body of claim 1, wherein an outer circumferential surface of the tube comprises an area that is perpendicular to the outlet end or decreases toward a center axis of the nozzle as the area is spaced far from the outlet end.

6. The valve body of claim 1, wherein at least a portion of the outlet end around the water passing hole is flat to be substantially perpendicular to an axial direction of the nozzle.

7. A water valve comprising:
   a nozzle connected to a liquid tank and serving as a path through which liquid is discharged; and
   a valve body provided at an end of the nozzle and opening/closing the nozzle by sliding along a lengthwise direction of the nozzle, wherein the valve body comprises:
   an outlet end at least partially covering a leading end surface of the nozzle and having a water passing hole formed at the outlet end through which the liquid is discharged;
   an outer insertion wall that extends from the outlet end toward the nozzle, provided outside an outer circumferential surface of an inner wall of the nozzle, and having a predetermined gap with the outer circumferential surface of the inner wall of the nozzle;
   a tube that extends from the outlet end toward an inner space of the nozzle, the tube configured to guide a portion of a flow of liquid from the nozzle toward the gap between the inner wall of the nozzle and the outer insertion wall; and
   an opening formed at the outlet end, the tube, or at least a part of the outlet end and the tube, the opening configured to connect a space between the outer insertion wall and the tube to at least any one of an inner space of the tube and the water passing hole.

8. The water valve of claim 7, wherein a section of a leading end of the nozzle is rounded.

9. The water valve of claim 7, wherein an external insertion ring is provided on an outer circumferential surface of the nozzle, the external insertion ring contacting the outer insertion wall of the valve as the valve slides.

10. The water valve of claim 9, wherein a step is provided around an inclined surface of the nozzle, the external insertion ring is inserted in a portion having a diameter decreased by the step, and the external insertion ring is supported by the step.

11. The water valve of claim 7, wherein a coupler for coupling to an end of a drain hole connected to the liquid tank is provided at the end of the nozzle in a direction opposite to a direction in which the valve body is provided.

12. The water valve of claim 11, wherein a pressing ring is provided at the coupler and forms a seal with the end of the drain hole, and a cross-section of the pressing ring is substantially rectangular.

13. The water valve of claim 7, wherein the nozzle further comprises the inner wall facing an inner circumferential surface of the outer insertion wall and an outer wall facing an outer circumferential surface of the outer insertion wall, and the inner wall and the outer wall are opened toward the leading end and the outer insertion wall is inserted in the lengthwise direction along a space between the inner wall and the outer wall.

14. A refrigerator comprising:
   a water tank;
   a nozzle connected to the water tank and serving as a path through which water is discharged; and
   a valve body provided at an end of the nozzle and opening/closing the nozzle by sliding along a lengthwise direction of the nozzle,
   wherein the valve body comprises:
   an outlet end at least partially covering a leading end surface of the nozzle and having a water passing hole formed at the outlet end through which the water is discharged;
   an outer insertion wall that extends from the outlet end toward the nozzle, provided outside an outer circumferential surface of an inner wall of the nozzle, and spaced from the outer circumferential surface of the inner wall of the nozzle by a predetermined distance;
   a tube that extends from the outlet end toward an inner space of the nozzle, the tube configured to guide a portion of a flow of liquid from the nozzle toward a space between the inner wall of the nozzle and the outer insertion wall; and an opening formed at the outlet end, the tube, or at least a part of the outlet end and the tube, the opening configured to connect a space between the outer insertion wall and the tube to at least any one of an inner space of the tube and the water passing hole.

15. The refrigerator of claim 14, wherein the nozzle and the valve body are provided at a door of the refrigerator, a water intake lever is further provided at the door, and a force pressing one side of the water intake lever is transferred to the valve body to allow the valve body to open the nozzle.

16. The refrigerator of claim 14, wherein the nozzle is detachably provided at the water tank.

* * * * *